United States Patent [19]

Vehmas

[11] Patent Number: 5,236,488
[45] Date of Patent: * Aug. 17, 1993

[54] METHOD AND APPARATUS FOR HEAT-STRENGTHENING GLASS SHEETS

[75] Inventor: Jukka H. Vehmas, Tampere, Finland

[73] Assignee: Tamglass Oy, Finland

[ * ] Notice: The portion of the term of this patent subsequent to Jan. 7, 2009 has been disclaimed.

[21] Appl. No.: 721,680

[22] Filed: Jun. 26, 1991

[30] Foreign Application Priority Data

Jul. 4, 1990 [FI] Finland .................... 903362

[51] Int. Cl.$^5$ .................... C03B 25/08; C03B 27/04
[52] U.S. Cl. .................... 65/114; 65/118; 65/161; 65/162; 65/349; 65/351
[58] Field of Search .................... 65/29, 114, 118, 161, 65/162, 348, 349, 351

[56] References Cited

U.S. PATENT DOCUMENTS

| 1,944,625 | 1/1934 | Ziegler | 49/47 |
| 2,188,401 | 1/1940 | Crowley | 65/161 |
| 3,304,166 | 2/1967 | Bolland | 65/273 |
| 4,225,333 | 9/1980 | Frank | 65/351 |
| 4,236,909 | 12/1980 | Thomas et al. | 65/351 |
| 4,400,194 | 8/1983 | Starr | 65/114 |
| 4,759,788 | 7/1988 | Ward | 65/114 |
| 4,816,058 | 3/1989 | Kuster et al. | 65/348 |
| 4,874,418 | 10/1989 | Kuster et al. | 65/348 |
| 5,078,774 | 1/1992 | Vehmas et al. | 65/118 |

FOREIGN PATENT DOCUMENTS

| 0246123 | 11/1987 | European Pat. Off. . |
| 0529735 | 7/1931 | Fed. Rep. of Germany . |
| 1285687 | 12/1968 | Fed. Rep. of Germany . |
| 2191998 | 12/1987 | United Kingdom . |

Primary Examiner—Joye L. Woodard
Attorney, Agent, or Firm—Burns, Doane, Swecker & Mathis

[57] ABSTRACT

The invention relates to a method and apparatus for heat-strengthening glass sheets. A glass sheet heated close to a softening temperature is heat strengthened by cooling it at a certain controlled cooling rate. The cooling is effected in a space between cooling panels and the cooling panels are cooled by a gas jet which is applied to the surfaces of cooling panels facing away from the glass sheet. A cooling space temperature measurement can be used for controlling the power of a cooling jet.

18 Claims, 5 Drawing Sheets

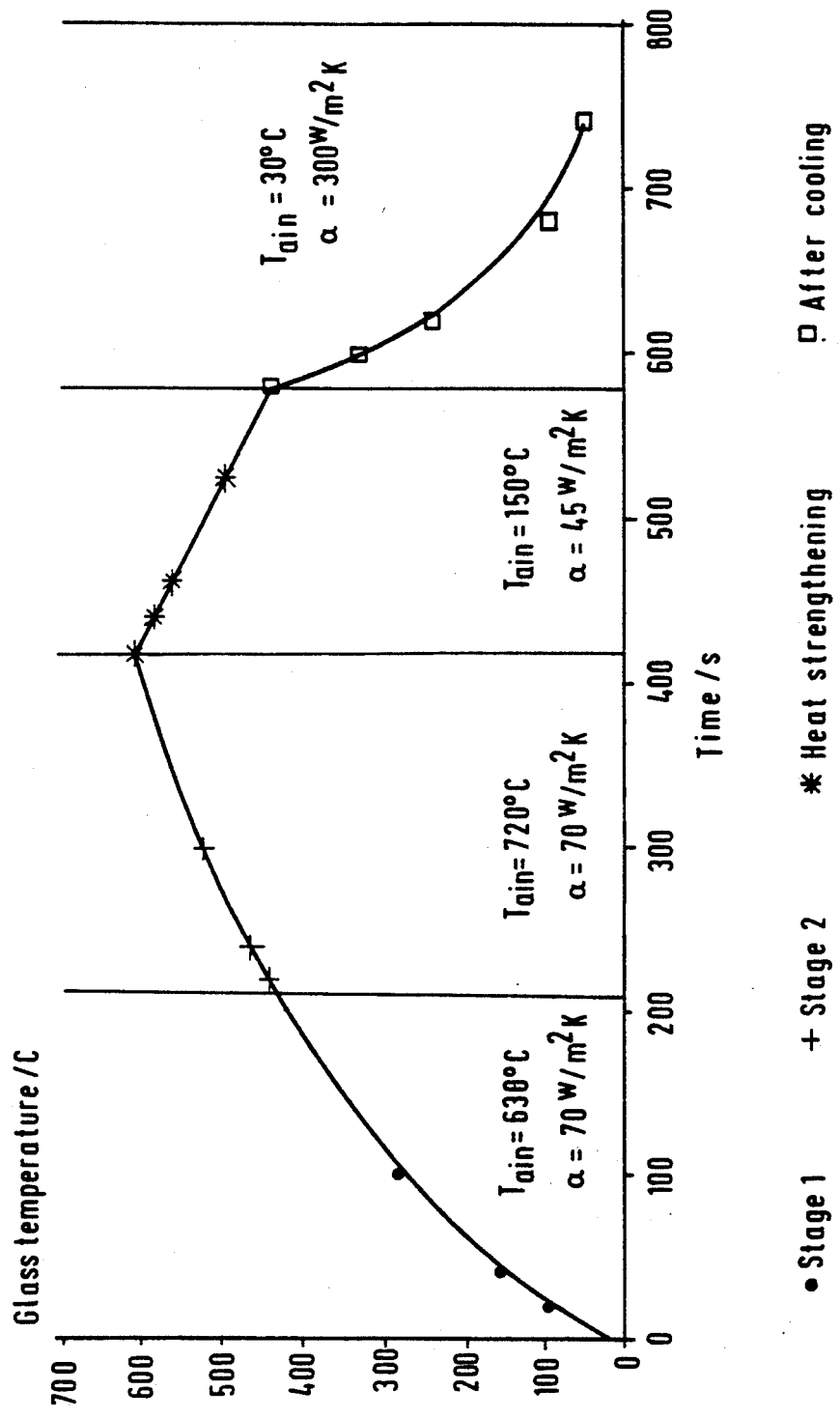

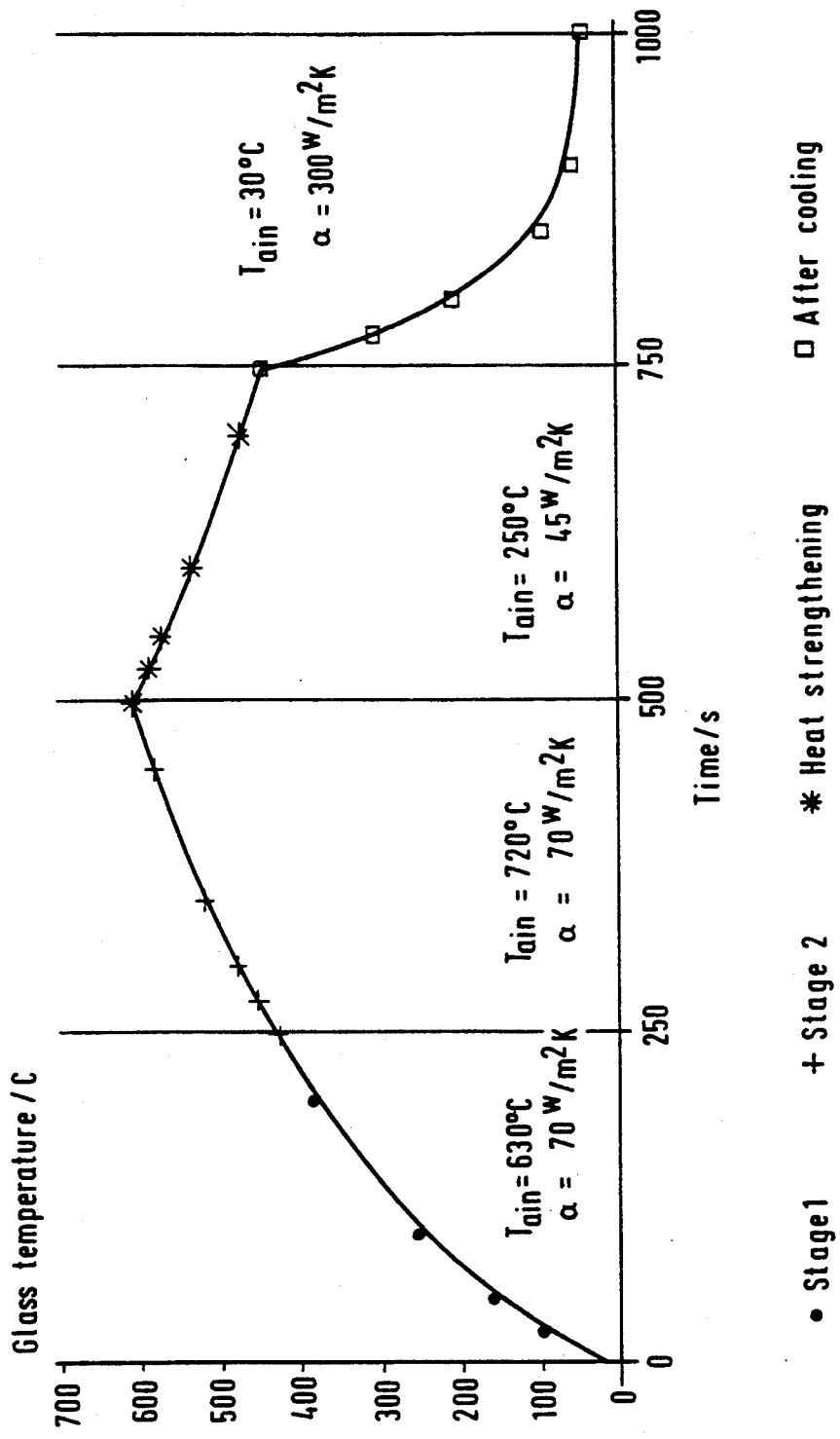

METHOD AND APPARATUS FOR HEAT-STRENGTHENING GLASS SHEETS

BACKGROUND AND SUMMARY OF THE INVENTION

The present invention relates to a method for heat-strengthening glass sheets, wherein a glass sheet is heated close to a softening temperature and then cooled at a certain controlled cooling rate. The invention relates also to an apparatus for heat-strengthening glass sheets, said apparatus comprising a furnace which is provided with heating elements for heating glass sheets close to a softening temperature, a cooling station which is provided with nozzles above and below a glass sheet for blowing a cooling gas, a blower which is connected to said nozzles by way of a manifold, and a conveyor for carrying glass sheets in horizontal direction through the furnace and the cooling station.

The heat-strengthening of glass differs from tempering in the sense that the cooling occurs at a substantially slower rate, which also substantially reduces the surface tensions of glass. The characteristics of heat-strengthened glass are described e.g. in the published GB application 2 191 998. In order to produce standardized heat-strengthened glass, it is necessary that the cooling rate be accurately controlled. A particular problem here is that, as the thickness of glass changes, the cooling rate also changes substantially (if cooling conditions remain constant).

On the basis of earlier experiences, it seems that e.g. 8 mm glass is heat-strengthened to the Japanese standards by bringing it to the room temperature after heating. This situation appears from the set of heat-strengthening curves shown in the accompanying FIG. 6. The figure shows that, if 10 mm glass is treated the same way (cooling at a room temperature), it is already subjected to an excessive heat strengthening. Thus, if 10 mm or 12 mm glass is to be heat-strengthened, this must be carried out in an environment hotter than a room temperature. The following estimates deal with the temperatures of a cooling environment required in heat strengthening. If glass is in slow movement in a quiet environment at a room temperature, according to performed measurements, it cools with a heat-transfer coeeficient of 45 W/m$^2$ K. Thus, the glass delivers heat at a rate of 50 kW/m$^2$. Supposing that the delivered heat capacity of 10 mm glass is obtained approximately as inversely proportional from glass thicknesses:

$$\frac{10 \text{ mm}}{8 \text{ mm}} = \frac{50 \text{ kW/m}^2}{P(10 \text{ mm})} => P(10 \text{ mm}) = 40 \text{ kW/m}^2$$

Thus, the temperature difference between glass and ambient air will be $$T = \frac{P(10 \text{ mm})}{\alpha \cdot 2 \cdot A} = \frac{40000 \text{ W/m}^2}{45 \cdot 2 \cdot 1} =$$

$$440° \text{ C}. => T_{air} = 610° \text{ C}. - 444° \text{ C}. \approx 150° \text{ C}.$$

In a corresponding calculation on 12 mm glass, $T_{air}$ will be 250° C. FIGS. 7 and 8 illustrate by way of an example the heating and heat-strengthening curves for 10 mm and 12 mm glasses. The curves reveal that e.g. 12 mm glass must remain within a 250° C. temperature environment for about 250 seconds. On the other hand, a maximum loading delivers heat at a rate of appr. 400 kW. In other words, if heat strengthening is effected in a closed environment, heat must be removed from the environment at a rate of appr. 400 kW in order to maintain the environment at a constant temperature. This corresponds to the supply of 20° C. air into the environment at a rate of 2 m$^3$/s, since at a rate of 400 kW air can be heated at 2 m$^3$/s from 20° C. to 250° C. Accordingly, in the case of 10 mm glass, the maximum loading delivers heat at a rate of appr. 450 kW, which corresponds to the raising of the temperature of appr. 3.7 m$^3$/s air flow from 20° C. to 150° C.

As pointed out above, the heat strengthening of e.g. 12 mm glass must be carried out at about 250° C. in an environment with no major air movements. If the heat strengthening is carried out in a furnace, the only possible approach is probably to supply into the furnace a sufficient amount of air at a room temperature in order to maintain temperature of the furnace air at equilibrium. On the other hand, this causes a strong movement of air, whereby the coefficient of heat transfer $\alpha$ is considerably increased, approximately doubled. Thus, the cooling rate will be too rapid and the actually required air temperature is in the order of 500° C. In fact, a problem here is to control the air input in a manner that $\alpha$ will remain approximately the same all over the glass and that the air flow coming into contact with glass has reached the same temperature everywhere in itself. Another problem is an increased transfer of heat caused by massive ceramic rolls, the problem being how to obtain the same cooling rate on the top and bottom surfaces of glass. A third problem is a possibility of glass breaking. It is an estimate that, on the average, every fiftieth glass is broken. This means that a furnace should be fitted with a scrap conveyor and, furthermore, a furnace must be quickly openable, so that the harmful shattered bits and pieces can be removed from between the rollers or from top of the lower resistances. A fourth problem is the inflexibility of a furnace to varying production: if heat-strengthened glass is produced today, today is no good for any other production since raising the furnace temperature back to the 700° C. temperature takes a long time. Furthermore, if one of the chambers of a dual-chamber furnace is used for heat strengthening, it means the heating of glass can only be effected in the other chamber and the lower temperature of the first chamber cannot be exploited. A result of this is then that the heating of largesize glasses becomes essentially more difficult.

An object of the invention is to provide a method and an apparatus for heat-strengthening glass sheets without the above problems. A particular object of the invention is to provide a method and an apparatus, whereby the cooling of even rather thick ($\geq$ 10 mm) can be carried out in a controlled fashion, i.e. at a sufficiently slow and uniform rate over the entire surface area of a glass sheet.

Another object of the invention is to provide a method and an apparatus capable of producing also tempered glass in addition to heat strengthening.

A particular additional object of the invention is to provide a method and an apparatus, capable of flexible production, i.e. also in small series, of both heat-strengthened and tempered glass with a varying glass thickness.

These objects are achieved in the invention on the basis of the characterizing features set forth in the annexed claims.

BRIEF DESCRIPTION OF THE DRAWING FIGURES

One embodiment of the invention will now be described in more detail with reference made to accompanying drawings, in which FIG. 1 shows an apparatus of the invention in a schematic vertical section.

FIG. 7 shows the temperature of 10 mm glass as a function of time at various stages of heat strengthening. In association with the glass temperature curve there is also shown the temperature of each treating station and a coefficient of heat transfer between glass and ambient air.

FIG. 8 is similar to FIG. 7 but deals with 12 mm glass where heat strengthening was carried out by using a test apparatus of the invention.

DETAILED DESCRIPTION OF THE PREFERRED EMBODIMENT

Figure 1:
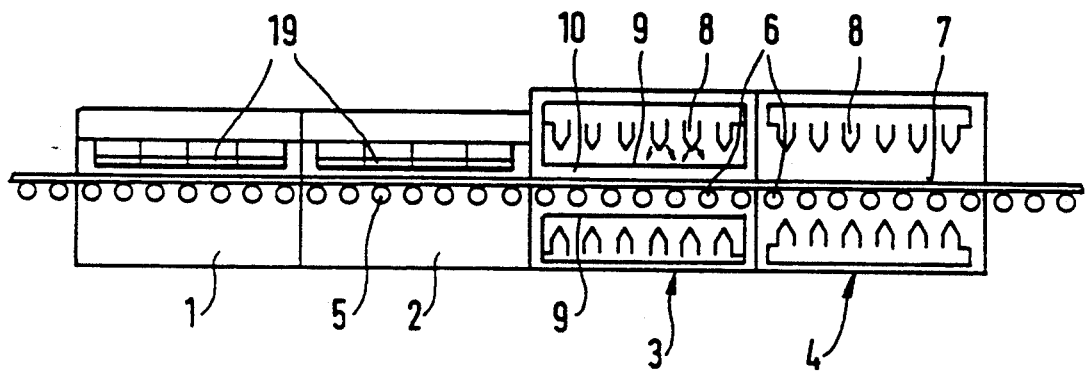

The apparatus shown in FIG. 1 includes a first furnace section 1, a second furnace section 2, a heat-strengthening station 3, and a cooling station 4. A conveyor included in furnace 1, 2 comprises horizontal rollers 5 and a conveyor included in stations or sections 3, 4 comprises horizontal rollers 6. Rollers 5 and 6 are used to carry glass sheets from one section to another and, in addition, by rotating the rollers in a reciprocating fashion, the glass sheets are set in an oscillating motion in each section. Heating elements 19 included in furnace sections 1 and 2 can be e.g. resistance elements but it is naturally possible to employ also other types of sources of heat, such as gas burners.

Stations 3 and 4 are provided with cooling air nozzles 8 on either side of a top surface level 7 of a conveyor consisting of rollers 6.

Figure 2:
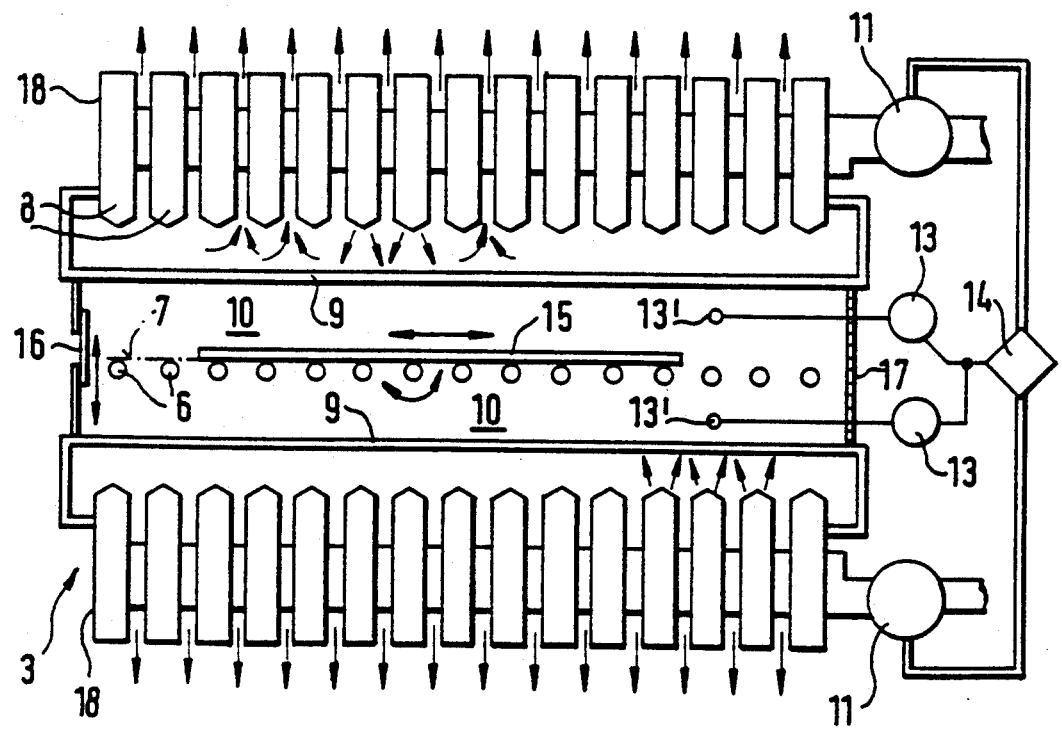
FIG. 2 is a more detailed view in a schematic vertical section showing a heat-strengthening station included in the apparatus.
Figure 3:
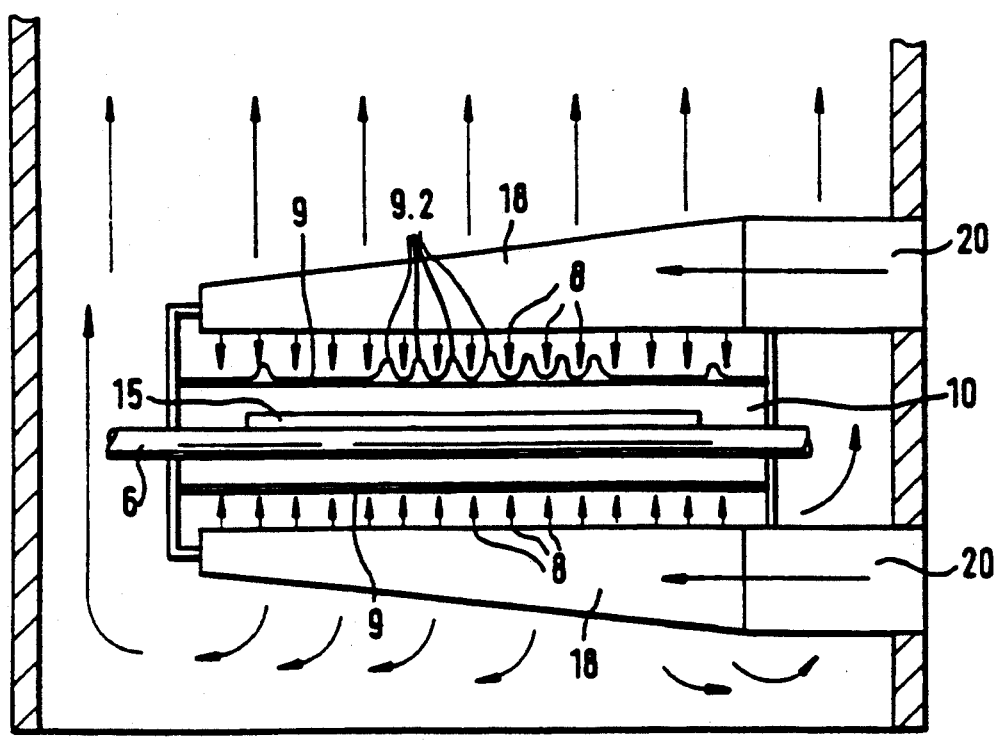
FIG. 3 shows a heat-strengthening station of the invention in a schematic cross-section.

As shown in more detail in FIG. 2, said nozzles 8 are associated with nozzle housings 18, the cooling air being supplied therein by means of blowers or fans 11 and 12. Naturally, it is also possible to employ compressors or combinations of fans and compressors depending on desired blast pressures and the actual size of a jet orifice. In terms of construction, said nozzles 8 can be identical to those typically used in the quenching stations of tempering plants. These have been generally known and used in various configurations for decades and, thus, such construction is not described further in this context.

Figure 4:
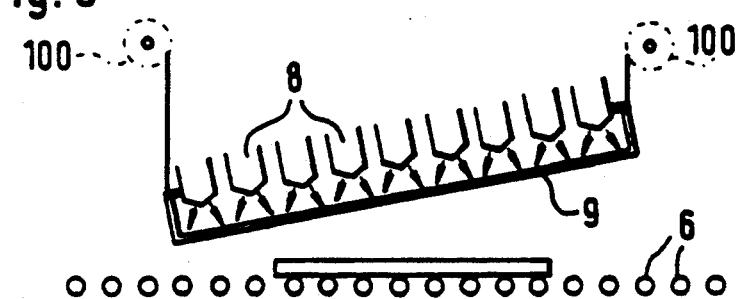
FIG. 4 is a schematic side view showing the openability of a heat-strengthening station of the invention.

A novel feature in the invention is the fitting of cooling panels 9 between blast nozzles 8 and a glass sheet 15 to be heat-strengthened. The cooling panels 9 are made of a highly heat-conductive material, preferably a metal, and secured to nozzle housings 18. The cooling panels 9 confine therebetween a heat-strengthening chamber 10, whose temperature can be controlled by cooling said upper and lower cooling panels 9 by means of cooling air jets. The power of fans 11 and 12 is controlled by means of temperature sensors 13', connected with thermostats 13 and a regulator 14. Said sensors 13' can be adapted to measure temperature between cooling panels 9 or glass temperature or both. In addition to controlling the power of fans 11 and 12, the temperature of space 10 can be controlled by adjusting the distance of panels 9 from glass sheet 15. The best way of doing this is to move the entire set of nozzle housings 18 together with their panels 9 in vertical direction. A means 100 for adjusting the height of the panels, such as is shown in U.S. Pat. No. 5,078,744, is shown in FIG. 4. Of course, it is also possible to make the distance of panels 9 from nozzles 8 adjustable.

The chamber space 10 is designed as a closed environment by having its ends and sides thermally insulated. Thus, heat is transmitted in a controlled fashion over the entire surface area of glass sheet 15 to cooled metal panels 9. The transmission of heat is effected by means of both radiation and convection. A thermal insulation barrier confining space 10 at the ends and sides, and serving also as a flow barrier, can be designed by using fixed or movable walls. FIG. 2 illustrates a vertically movable gate 16 in the end wall. Especially at the ends, the insulation and flow barrier can also comprise an air screen 17 which closes after a glass sheet has arrived in the chamber space. It is also possible that, particularly with small-size glasses, the space confined by said panels has open sides.

Metal panels 9 are preferably solid continuous plates and the material thereof is e.g. AISI 304 2BA Steel. One or each surface of cooling panels 9 can be provided with heat-exchange ribs 9.2 for intensifying the transmission of heat. This may be necessary as heat must be removed from chamber 10 at a rate of 450 kW (which is roughly equivalent to the cooling capacity of the refrigeration machinery of an indoor ice-hockey rink).

As a result of the temperature difference between glass sheets 15 and ambient air there will be undesired flows created also in chamber 10 leading to a non-uniform cooling of glass sheet 15. Primarily, the cooling power increases in the marginal sections of a glass sheet. In order to compensate for this irregular cooling effect, it may be preferable that the surface area of heat-exchange ribs 9.2 per unit area of cooling panel 9 be larger in the central area of a cooling panel than in the end and/or side edges. In fact, generally by varying the density and/or height of heat-exchange ribs 9.2 it is possible to eliminate the irregularities detected in cooling. It is also possible to employ local heating resistances e.g. between rollers 6 for controlling the regularity of cooling. When heat-strengthening small individual pieces of glass, such resistances can be used at the same time for preheating the chamber space, if necessary.

By arranging the nozzle housings along with panels 9 thereof to be pivotable by the area of one of the side edges thereof or, as shown in FIG. 4, by the area of at least one of the ends thereof to lie at a major distance from conveyor 6, the bits of broken glass can be readily removed. Such an arrangement is shown, for example, in U.S. Pat. No. 5,078,744 and is shown as the adjusting means 100 in FIG. 4.

Figure 5:
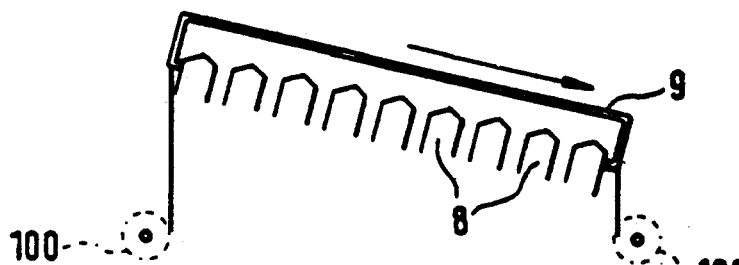
FIG. 5 is schematic side view showing an alternative embodiment for the heat-strengthening station.
Figure 5:
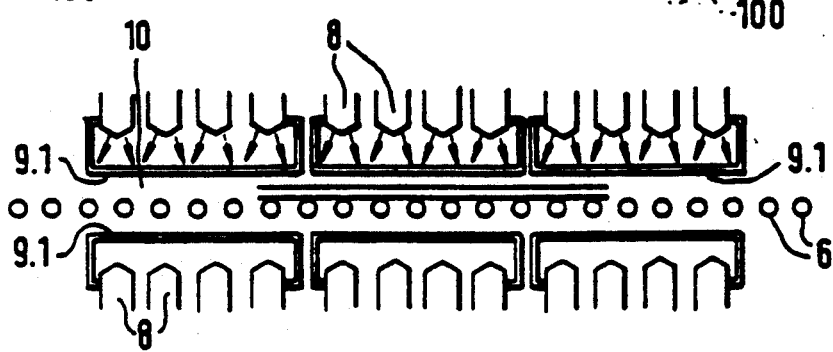
Figure 6:
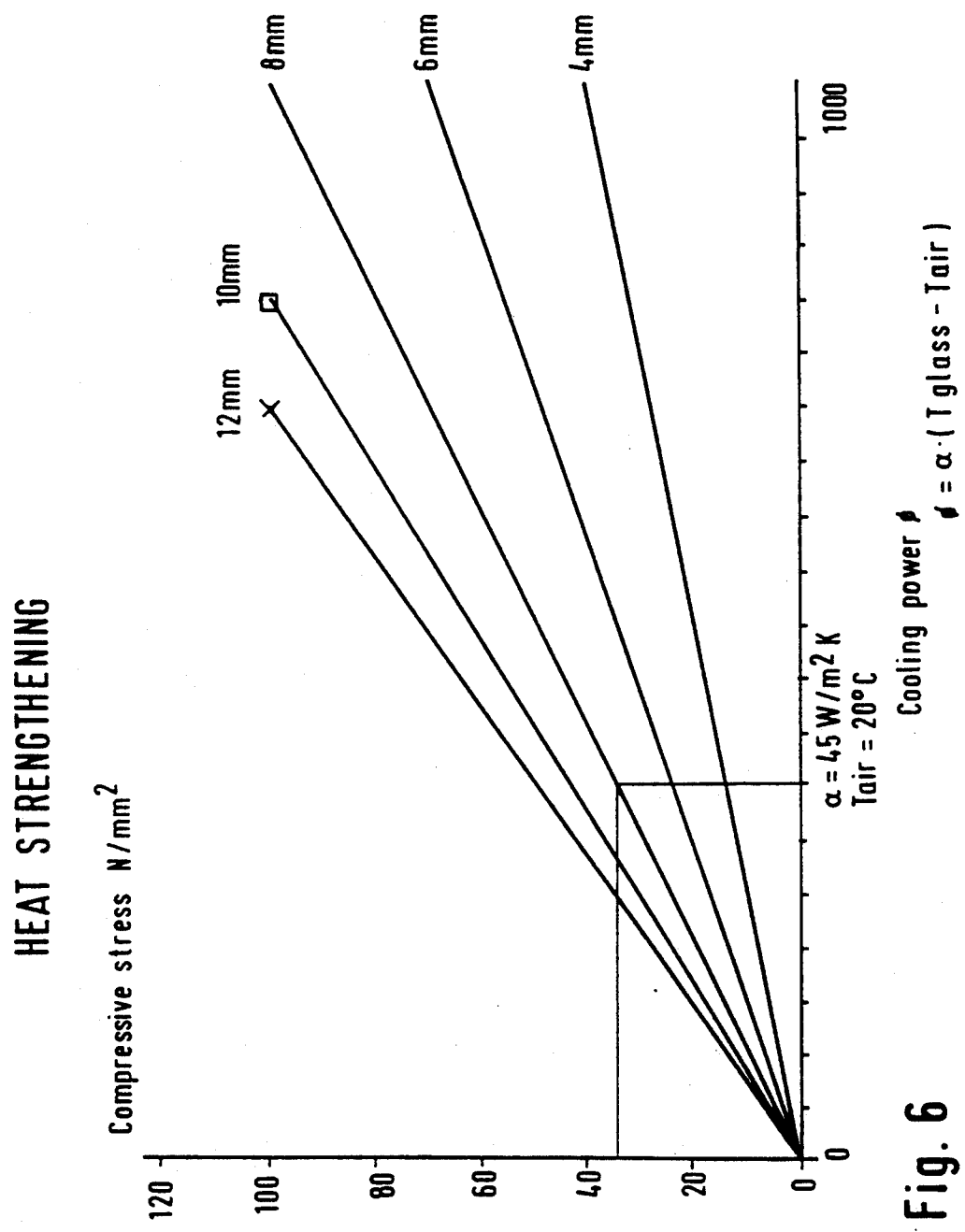
FIG. 6 illustrates heat-strengthening curves for various glass thicknesses.

Neither need said panels 9 be continuous over the entire surface area of heat-strengthening station 3 but the panels can be made up by smaller panel units 9.1, as shown in FIG. 5. Thus, for example, the material and thickness of various panel units 9.1 can be selected to be different e.g. in the central and marginal areas.

Another special feature associated with a heat-strengthening apparatus of the invention is that one and the same apparatus can be readily used also for tempering glasses having varying thicknesses. The glass heat-strengthening process involves the heat-strengthening of glass in station 3 and then rapidly cooling it in station 4 by means of an effective cooling air blast, as shown by the curves of FIGS. 7 and 8. If, instead of heat strengthening, the glass is to be tempered, it will be driven through heat-strengthening station 3 directly into cooling station 4 for carrying out an effective quenching operation. This can be done on all types of glass having a thickness over 3 mm. However, the apparatus is capable of tempering also 3 mm thick glass by designing cooling panels 9 to be readily removable whereby, with panels 9 removed, the quenching operation can be carried out in station 3. Thus, even thin glass does not have enough time for excessive cooling prior to a tempering blast.

The invention is not limited to the above embodiment but a variety of modifications can be to its details and structural design within a scope of protection defined by the annexed claims.

What is claimed is:

1. A method for heat-strengthening glass sheets, comprising the steps of:
   heating a glass sheet close to a softening temperature, the glass sheet having a top and a bottom side;
   conveying the heated glass sheet, by horizontal conveyor means, into a space between two or more cooling panels including a top and a bottom cooling panel, the cooling panels having inner and outer surfaces, the heated glass sheet being conveyed at a vertical distance from the inner surfaces of the top and bottom cooling panels;
   controllably cooling the cooling panels by applying a gas jet to at least a portion of the outer surfaces of the cooling panels, while oscillating the heated glass sheet between the surfaces of the cooling panels with the conveyor means;
   measuring a temperature between the cooling panels with a temperature measuring means; and
   adjusting the power with which the gas jet is applied to attain a desired temperature between the cooling panels.

2. A method as set forth in claim 1, comprising the further step of adjusting the distance of the cooling panels from the heated glass sheet.

3. A method for heat-strengthening glass sheets, comprising the steps of:
   heating a glass sheet close to a softening temperature, the glass sheet having a top and bottom side;
   conveying the heated glass sheet, by a horizontal conveyor means, into a space between two or more cooling panels including a top and a bottom cooling panel, the cooling panels having inner and outer surfaces, the heated glass sheet being conveyed at a vertical distance from the inner surfaces of the top and bottom cooling panels;
   controllably cooling the cooling panels by applying a gas jet to the outer surface of the cooling panels, while oscillating the heated glass sheet between the inner surfaces of the cooling panels with the conveyor means;
   separately measuring the temperature at the top and the bottom side of glass sheet fitted between the cooling panes; and
   separately adjusting the power with which the gas jet is applied on the top cooling panel and the power with which the gas jet is applied on the bottom cooling panel.

4. An apparatus for heat-strengthening glass sheets comprising:
   a furnace which is provided with heating elements for heating glass sheets close to a softening temperature;
   a cooling station which is provided with cooling nozzles through which is blown a cooling gas;
   blowing means which is connected to the cooling nozzles by a manifold;
   a conveyor with a top surface for carrying glass sheets in a horizontal direction through the furnace and the cooling station;
   cooling panels, including upper and lower cooling panels, disposed within the cooling station, the conveyor being disposed at a vertical distance between the upper and lower cooling panels, the conveyor oscillating glass sheets between the upper and lower cooling panels, the upper and lower cooling panels forming a cooling space in which glass sheets deliver heat to the cooling panels, the cooling panels being cooled by blowing of the cooling gas;
   top and bottom temperature measuring elements provided above and below the top surface of the conveyor for obtaining temperature measurements; and
   means for controlling the power with which cooling gas is blown through the cooling nozzles to attain a desired temperature measurements.

5. An apparatus as set forth in claim 4, further comprising means for adjusting the vertical distance of the cooling panels from the top surface of the conveyor.

6. An apparatus as set forth in claim 5, further comprising nozzle housings upon which the cooling panels are mounted, the nozzle housings being adjustable to various vertical distances from the top surface of the conveyor.

7. An apparatus as set forth in claim 6, further comprising means for positioning the nozzle housings and the cooling panels at a sufficient vertical distance from the conveyor for facilitating the removal of pieces of broken glass.

8. An apparatus as set forth in claim 4, wherein the cooling panels are solid plates.

9. An apparatus as set forth in claim 4, wherein the cooling panels consist of a plurality of abutting elements.

10. An apparatus for heat-strengthening a glass sheet, comprising:
    a furnace which is provided with heating elements for heating glass sheets close to a softening temperature;
    a cooling station which is provided with cooling nozzles through which is blown a cooling gas;
    blowing means which is connected to the cooling nozzles by a manifold;
    a conveyor with a top surface for carrying glass sheets in a horizontal direction through the furnace and the cooling station;
    cooling panels, including upper and lower cooling panels, disposed within the cooling station, the conveyor being disposed at a vertical distance between the upper and lower cooling panels, the conveyor oscillating glass sheets between the upper and lower cooling panels, the upper and lower cooling panels forming a cooling space in which glass sheets deliver heat to the cooling panels, the cooling panels being cooled by blowing of the cooling gas;

wherein the cooling panels are provided with heat-exchange ribs on the cooling panels and the density and height characteristics of the heat-exchange ribs differ at different parts of the cooling panels.

11. An apparatus as set forth in claim 10, wherein the surface area of the heat-exchange ribs per unit area of the cooling panels is larger at a central area of the cooling panels than at an end or a side edge.

12. An apparatus for heat-strengthening glass sheets, comprising:

a furnace which is provided with heating elements for heating glass sheets close to a softening temperature;

a cooling station which is provided with cooling nozzles through which is blown a cooling gas;

blowing means which is connected to the cooling nozzles by a manifold;

a conveyor with a top surface for carrying glass sheets in a horizontal direction through the furnace and the cooling station;

cooling panels, including upper and lower cooling panels, disposed within the cooling station, the conveyor being disposed at a vertical distance between the upper and lower cooling panels, the conveyor oscillating glass sheets between the upper and lower cooling panels, the upper and lower cooling panels forming a cooling space in which glass sheets deliver heat to the cooling panels, the cooling panels being cooled by blowing of the cooling gas;

top and bottom temperature measuring elements provided above and below the top surface of the conveyor for obtaining temperature measurements; and means for controlling the power with which cooling gas is blown through the cooling nozzles to attain a desired temperature measurements wherein the cooling panels are removable and the cooling nozzles serve as a quenching station, whereby the removal of the cooling panels transforms a heat-strengthening station into a quenching station.

13. An apparatus as set forth in claim 12, wherein the apparatus includes two substantially adjacent cooling stations, one of the cooling stations being provided with cooling panels, the other cooling station having no cooling panels and serving as a quenching station.

14. An apparatus for heat-strengthening a glass sheet, comprising:

a furnace which is provided with heating elements for heating glass sheets close to a softening temperature;

a cooling station which is provided with cooling nozzles through which is blown a cooling gas;

blowing means which is connected to the cooling nozzles by a manifold;

a conveyor with a top surface for carrying glass sheets in a horizontal direction through the furnace and the cooling station;

cooling panels, including upper and lower cooling panels, disposed within the cooling station, the conveyor being disposed at a vertical distance between the upper and lower cooling panels, the conveyer oscillating glass sheets between the upper and lower cooling panels, the upper and lower cooling panels forming a cooling space in which glass sheets deliver heat to the cooling panels, the cooling panels being cooled by blowing of the cooling gas; and means for adjusting the vertical distance of the top cooling panel from the top surface of the conveyor and the vertical distance of the bottom cooling panel from the top surface of the conveyor.

15. A method for heat-strengthening glass sheets, comprising the steps of:

heating a glass sheet close to a softening temperature, the glass sheet having a top and a bottom side;

conveying the heated glass sheet, by a horizontal conveyor means, into a first cooling station between a top and a bottom cooling panel of the first cooling station, the cooling panels having inner and outer surfaces, the heated glass sheet being conveyed at a distance from the inner surface of the cooling panels;

controlledly cooling the cooling panels by applying a gas jet to the outer surface of the cooling panels while oscillating the heated glass sheet between the inner surfaces of the cooling panels with the conveyor means;

measuring a temperature between the cooling panels with at least one temperature measurement means;

adjusting the power with which the gas jet blows against the outer surface of the cooling panels to attain desired temperature characteristics within the first cooling station;

conveying the heated glass sheet from the first cooling station to a second cooling station and applying the gas jet to the heated glass sheet to quench the glass sheet.

16. A method as set forth in claim 15, wherein glass sheets are conveyed from the first cooling station to the second cooling station when the glass sheet temperature is between 420° C.–470° C.

17. An apparatus for heat-strengthening glass sheets, comprising:

a furnace which is provided with heating elements for heating glass sheets close to a softening temperature;

a cooling station which is provided with cooling nozzles through which is blown a cooling gas;

blowing means which is connected to the cooling nozzles by a manifold;

a conveyor with a top surface for carrying glass sheets in a horizontal direction through the furnace and the cooling station;

cooling panels, including upper and lower cooling panels, disposed within the cooling station, the conveyor being disposed at a vertical distance between the upper and lower cooling panels, the conveyor oscillating glass sheets between the upper and lower cooling panels, the upper and lower cooling panels forming a cooling space in which glass sheets deliver heat to the cooling panels, the cooling panels being cooled by the cooling gas and covering the entire area upon which the cooling gas is blown; and top and bottom temperature measuring elements provided above and below the top surface of the conveyor for obtaining temperature measurements; and means for controlling the power with which cooling gas is blown through the cooling nozzles to attain a desired temperature.

18. An apparatus for heat-strengthening glass sheets, comprising:

a furnace which is provided with heating elements for heating glass sheets close to a softening temperature;

a cooling station having an entrance and an exit, the cooling station being provided with cooling nozzles through which is blown a cooling gas;

blowing means which is connected to the cooling nozzles by a manifold;

a conveyor with a top surface for carrying glass sheets in a horizontal direction through the furnace and the cooling station;

cooling panels, including upper and lower cooling panels, disposed within the cooling station, the conveyor being disposed at a vertical distance between the upper and lower cooling panels, the conveyor oscillating glass sheets between the upper and lower cooling panels, the upper and lower cooling panels forming a cooling space in which glass sheets deliver heat to the cooling panels, the cooling panels being cooled by the blowing of the cooling gas;

top and bottom temperature measuring elements provided above and below the top surface of the conveyor for obtaining temperature measurements;

means for controlling the power with which cooling gas is blown through the cooling nozzles to attain a desired temperature;

a vertically movably entrance panel, the vertically movable entrance panel being vertically movable such that the glass sheets are conveyable by the conveying means through the entrance to the cooling station between the cooling panels, the vertically movable entrance panel being further vertically movable to close the entrance to the cooling station; and a vertically movable exit panel, the vertically movable exit panel being vertically movable such that glass sheets are conveyable by the conveying means through the exit of the cooling station from between the cooling panels, the vertically movable exit panel being further vertically movable to close the exit to the cooling station.

* * * * *